United States Patent Office 2,936,057
Patented May 10, 1960

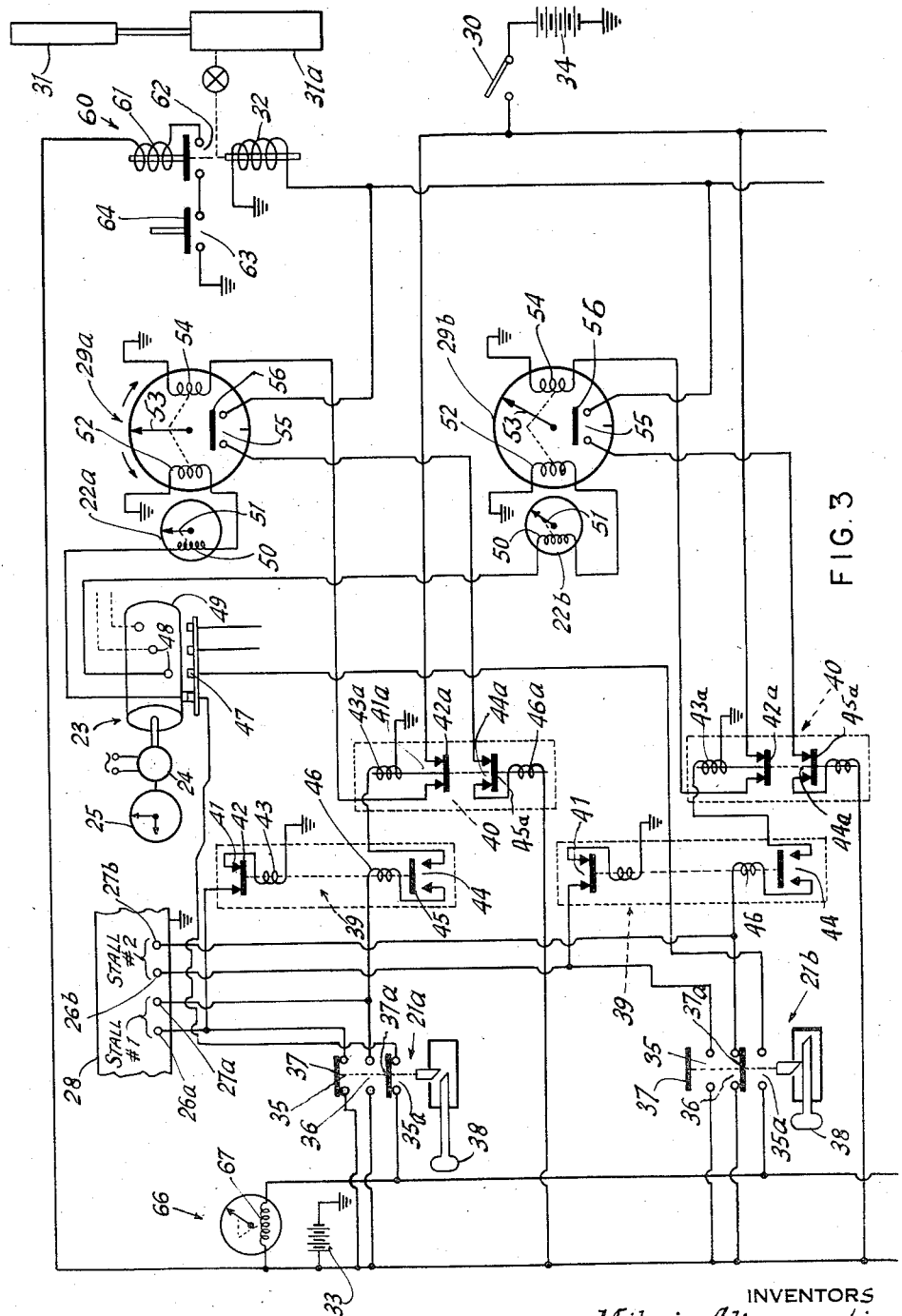

2,936,057
CONTROL SYSTEM FOR PARKING GARAGES

Mihai Alimanestiano and Serban Alimanestiano, New York, N.Y., assignors, by direct and mesne assignments, to Speed-Park, Inc., a corporation of New York Application July 27, 1956, Serial No. 600,485

9 Claims. (Cl. 194—9)

This invention relates to a control system for garages for parking vehicles wherein parking charges are made in accordance with the time interval during which a vehicle is within the garage.

It has been proposed to provide vehicle parking facilities in congested urban areas in the form of buildings designed for maximum utility of space. Obviously, the parking period of any given vehicle within such facility may be for a nominal period of time, or may be over an extended time interval. In either case, such a garage facility, having a large vehicle capacity, presents a problem of determining and recording the parking interval for each individual vehicle; calculating the corresponding parking charges; and releasing the vehicles upon payment of the charges. The manpower necessary to take care of such records and charges on a conventional basis may be so large as to introduce very substantial cost factors in the operation of the garage facility.

It has also been proposed to provide automatic parking garages in which vehicles are picked up by suitable mechanism, moved to selected parking stalls within the garage and returned from such stalls at the end of the parking period by the same or similar mechanism, all in a cyclical manner.

Accordingly, an object of this invention is to provide for use in automatic parking garages having cyclically operated vehicle pick-up means for automatically transporting vehicles between a pick-up or delivery station and selected parking stalls, automatic control means for measuring the parking interval of each vehicle in its stall, indicating the corresponding parking charge and releasing the delivered vehicle to the driver upon payment of the parking charge into a coin operated device which is associated with the charge indicating and release devices.

Another object of this invention is to provide for use in an automatic parking garage, a control system of the character described which includes a key operated switch for each individual parking stall for initiating the parking cycle at the beginning of the parking period and initiating the delivery cycle at the end of the parking period; the absence of a key from its switch indicating that the associated stall is in use while the presence of a key in its switch indicating that the associated stall was available for use.

Still another object of this invention is to provide in a control system of the character described, circuit means responsive to the operation of the key switches for measuring parking periods for each occupied parking stall, calculating the corresponding parking charges and for actuating obstacle means in a manner to release a delivered vehicle to the driver upon payment of the calculated parking charges.

Other objects of this invention will in part be obvious and in part hereinafter pointed out.

In the drawing,

Fig. 3 is a circuit diagram of the system.

Figure 1:
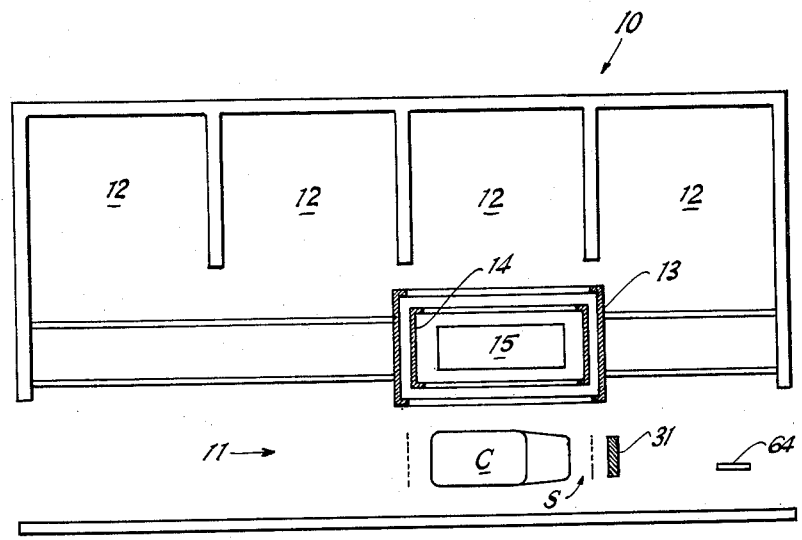
Fig. 1 is a plan view of a portion of an automatic parking garage utilizing the control system embodying the invention.
Figure 2:
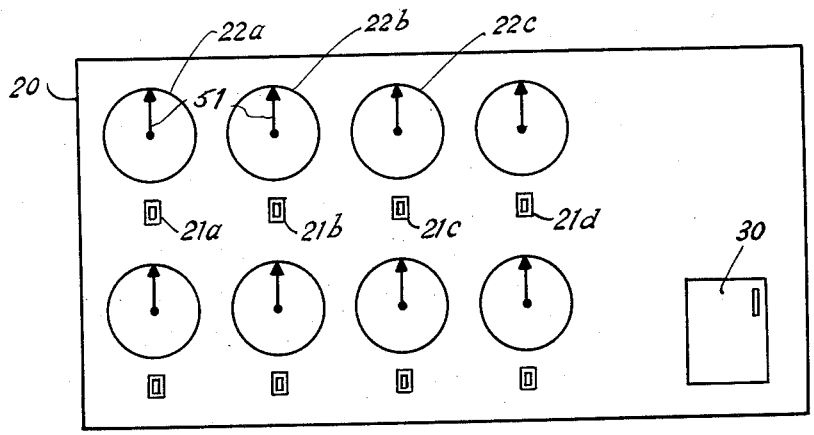
Fig. 2 is an elevational view of a control panel forming part of the system.

Referring in detail to the drawing and particularly to Fig. 1, 10 designates a vehicle parking garage of the type including a through driveway 11, with individual parking stalls 12 on one side thereof, the stalls being arranged in vertical tiers, all in a manner known in the art.

A mobile tower or device generally indicated at 13 and containing an elevator 14 or device, is adapted to travel laterally of driveway 11 for servicing stalls 12. A dolly or pickup device generally indicated at 15, is adapted to move in a direction to engage a vehicle C which has been driven into driveway 11 and halted within a station S. The engaged vehicle C is moved laterally by means of device 15 into elevator 14, the tower 13 being aligned with station S. Thereafter, tower 13 moves to a position in which the same is aligned with a selected vertical column of stalls 12 and the elevator 14 rises to a selected horizontal level where the device 15 moves into a selected stall 12 to deposit the vehicle C therein.

It is understood that the operation of pickup device 15, tower 13 and elevator 14 is of a cyclical nature with suitable electrically operated control systems to actuate the several devices in timed sequence in order to bring the vehicle C to the proper stall 12 as described above. When the vehicle C is to be returned to station S at the end of the parking period, a delivery cycle is automatically placed in operation involving the several indicated devices. The details of the various control and actuating means for devices 13, 14 and 15 form no part of the instant invention.

In accordance with the instant invention, a control system is provided for use with the automatic parking and delivery means described above, which indicates visibly to the driver of the incoming vehicle C those stalls 12 not in use and therefore available for parking his vehicle; which allows the driver to initiate the parking cycle to deliver vehicle C to a selected parking stall 12 while simultaneously starting the operation of a time measuring and indicating device having a parking charge calculating means associated therewith; and thereafter, at the termination of the parking period, when it is desired to have the vehicle C returned to station S from its parking stall 12, to initiate the delivery cycle to effect such vehicle return.

Simultaneously with the initiation of the delivery cycle, the time indicating device stops its operation showing the parking charges due and upon payment of the indicated charges into a coin operated device forming part of the system, obstacle means in driveway 11 which prevents forward movement of vehicle C from station S, is rendered inoperative, allowing the vehicle to be driven out of garage 10.

To this end, the system of the invention includes a panel 20 which may be centrally located adjacent driveway 11, for the convenience of the vehicle drivers. The panel 20 has mounted thereon a plurality of similar two-position, key operated switches 21a, 21b, 21c, etc., corresponding in number to the number of stalls 12 in the garage. The switches 21a, 21b, etc. are suitably identified and correlated to their respective stalls 12 by number or other indicia. In addition, panel 20 has mounted thereon adjacent each of the key switches 21a, 21b, etc., electrically operated time elapse devices 22a, 22b, etc., such devices visibly indicating the elapsed time interval for parking the vehicle in a stall 12 corresponding to such device, and further visibly indicating the parking charges for such time interval; the charges being based on a predetermined rate per unit parking time.

As shown in Fig. 3, each of the switches 21a, 21b, etc., and associated devices 22a, 22b, etc., are interconnected in a control circuit including a single drum type selector switch 23 operated by a suitable motor 24 controlled by a clock device 25, whereby the selector switch is operated through a single revolution at predetermined time intervals, all in a manner known in the art.

Each switch 21a, 21b, etc., is also connected in circuit with a pair of signal input terminals 26a, 27a; 26b, 27b, etc. suitably mounted on a cyclical control panel 28. Terminal 26a is connected in a control circuit, not shown, operative to initiate the parking cycle above described while terminal 27a is connected in a control circuit, not shown, operative to initiate the delivery cycle previously described. Additionally, there is provided for association with each of the switches 21a, 21b, etc., a combination time indicating and parking charge calculating device generally indicated at 29a, 29b, etc. The parking charge for the elapsed time interval is indicated in accordance with a predetermined rate per unit time.

The control system further includes a single coin operated switch 30 mounted on panel 20; and a movable barrier device generally indicated at 31. Device 31 may be disposed in driveway 11 in advance of station S; such device being movable between an operative position in which vehicle C is prevented from moving forwardly from station S, and an inoperative position in which the vehicle is free to move out of garage 10. The device 31 may be actuated by suitable means such as a pneumatically operated mechanism 31a, whose valve is under the control of a solenoid 32 forming a part of the control system, as hereinafter described.

Current is supplied to the control system from a suitable source indicated at 33. Current for operating a portion of devices 29a, 29b, etc. is supplied from another source indicated at 34 and later described in detail.

Switches 21a, 21b, etc., each comprise sets of fixed contacts 35, 35a respectively bridged by movable contacts 37, 37a when a key 38 is removed from the switches, and a set of fixed contacts 36 bridged by contact 37a when said key is inserted into the switches.

Contacts 35 of switch 21a are connected between the current source 33 and signal input terminal 26a, corresponding to a selected parking stall 12, say #1 for the purpose of illustration. Similarly, contacts 36 of switch 21a are connected between current source 33 and signal input terminal 27a, which also corresponds to stall #1. In the same manner, the contacts 35, 36 of switch 21b are connected between the current source and the signal input terminals 26b, 27b which may correspond to stall #2. Thus, each of the switches 21a, 21b, etc. is related to a particular stall 12 through the signal input terminals thereof which control the parking and delivery cycles previously described.

It is understood that a key 38 present in any of the switches 21a, 21b, etc., indicates that the corresponding stall 12 is unoccupied and available. Assuming that a driver has driven a vehicle C to the station S in drive 11, as indicated in Fig. 1, and then withdrew key 38 from switch 21a corresponding to stall 12 identified as #1, contacts 35 of the switch are bridged causing a signal current to flow to terminal 26a which is operative to initiate the parking cycle effective to actuate device 15 to engage the vehicle, draw the same into elevator 14 and tower 13 is operated to move the same to a position where elevator 14 may rise to the proper level and align device 15 with stall #1, the device thereafter moving to deposit the vehicle therein. The cycle is completed by appropriate movement of device 15 back into elevator 14 and movement of tower 13 to its starting position.

Associated with switch 21a is a pair of two position relays generally indicated at 39, 40. Relay 39 comprises fixed contacts 41 and a bridging contact 42 operated by a relay winding 43 which is grounded on one side and connected on the other side to one contact 41. Relay 39 further includes fixed contacts 44 and a bridging contact 45 therefor which is operated by a relay winding 46, the bridging contacts 42, 45 having conjoint movement. The conjoint armature of windings 43 and 46, when moved, remains in its moved position.

Relay 40, similarly includes fixed contacts 41a, 44a, respective bridging contacts 42a, 45a arranged for conjoint movement, and relay windings 43a, 46a. Drum switch 23 includes a set of fixed contacts 47 respectively related to the switches 21a, 21b, etc., and respectively connected to one side of contacts 35a thereof; and a set of contacts 48 arranged on a rotary member 49 of the switch in opposed relation to contacts 47. It is apparent that at stated intervals as predetermined by suitable setting of clock 25, motor 24 is operative to rotate member 49 of switch 23 to sweep contacts 47 by opposed contacts 48 in a single revolution of said member.

The contacts 48 of switch 23 are respectively connected to the time elapse devices 22a, 22b, etc., through the actuating coil 50 thereof which is operative to move pointer 51 by ratchet means, not shown, in a manner known in the art. Coil 50 is connected in series with device 29a through a similar actuating coil 52 thereof, operative to move pointer 53 by ratchet means, not shown, in a clockwise direction and in synchronized relation to the movement of pointer 51 on associated device 22a. The other side of coil 52 is grounded.

Device 29a further includes resetting means in the form of a second actuating coil 54 operative to move pointer 53 by a separate ratchet means, not shown, in a counterclockwise direction to the starting point thereof. Finally, device 29a includes a pair of fixed contacts 55 and a bridging contact 56 which is moved to bridge contacts 55 only in response to movement of pointer 53 in a counterclockwise direction to its zero or reset position.

Coil 54 of device 29a is grounded on one side and connected on the other to one side of coin operated switch 30 through relay contacts 41a, the other side of switch 30 being connected to current source 34 which is grounded on one side. Relay winding 43 is connected to current source 33 through relay contacts 41 and switch contacts 35. Relay windings 46 and 43a are series connected to the current source 33 through switch contacts 36 and relay contacts 44. Relay winding 46a is connected to current source 33 and solenoid 32 through relay contacts 44a and fixed contacts 55 of device 29a.

A relay 60 has its winding 61 connected on one side to current source 33 and on the other side to relay contacts 62 which are in series with the contacts 63 of a normally open, spring biased switch 64. Switch 64 may be located in driveway 11 forwardly of barrier 31, to be closed by movement of vehicle C as the same leaves garage 10, for the purpose hereinafter described.

Upon removal of key 38 from switch 21a, to initiate the parking cycle through a signal current applied to input terminal 26a, relay winding 43 is energized, causing contacts 44 to be bridged by contact 45 and simultaneously opening contacts 41. Also, drum switch 23 is effective upon rotation of its member 49 at each of the predetermined time intervals governed by the setting of clock 25, to pulse devices 22a, 29a through their coils 50, 52 respectively, causing the pointers 51, 53 thereof to advance clockwise to measure and visibly indicate such time intervals. Additionally, pointers 51, 53 will indicate the parking charge measured by a predetermined rate per unit interval.

When the vehicle owner returns to reclaim the vehicle C, he inserts key 38 into switch 21a, causing contacts 36 to be bridged, allowing a signal pulse to be transmitted to input terminal 27a to initiate the delivery cycle whereby sequential operation of pickup device 15, tower 13 and elevator 14 is effective to bring vehicle C from its stall 12 to station S in driveway 11, where its movement out of garage 10 is impeded by barrier 31 now in its operative position.

With contacts 36 bridged, contacts 35a are opened, thereby deenergizing coils 50, 52 to halt any further clockwise movement of pointers 51, 53. Furthermore, with contacts 44 already closed, relay winding 43a is energized to close contacts 41a, placing coil 54 of device 29a in a ready circuit; contacts 44a also being closed.

The vehicle owner reads on device 22a the elapsed parking interval and the charges due for such interval. Coins may then be inserted into coin operated switch 30 which is adapted to provide signal pulses in proportion to the denomination of the coins, in a known manner. Such signal pulses from current source 34 energizes coil 54 to effect a counterclockwise movement of pointer 53 which moves to the zero or starting position, reaching the same when the correct amount of coins corresponding to the indicated charge, has been inserted in coin switch 30.

At this time, contact 56, actuated by pointer 53, bridges contacts 55, to close the circuit including solenoid 32 through closed relay contacts 44a, thereby actuating barrier 31 to move the same to an inoperative position, thereby permitting the vehicle C to be driven out of garage 10. The armature of solenoid 32 is connected to the armature of relay 60, thus closing relay contacts 62 when solenoid 32 is energized. As vehicle C moves through driveway 11, switch 64 is closed by contact with the moving vehicle to energize winding 61, causing the armature of solenoid 32 to move in a direction to operate the switch of device 31a to thereby restore barrier 31 to its operative position.

It will be apparent that if key switch 21b is operated by first removing its key 38, and later reinserting said key, as previously described, signal pulses will pass to input terminals 26b, 27a at the beginning and end of the parking period of vehicle C, which in this case will be sent to, and delivered from, stall 12 corresponding to switch 21b. Associated devices 22b, 29b will be operated through contacts 35a of switch 21b and drum switch 23 to measure the elapsed time interval and corresponding parking charge, as previously described. Coin operated switch 30 will respond to the deposit therein of the correct amount of coins to actuate barrier 31 and to thus release vehicle C.

The insertion of key 38 into switches 21a, 21b, etc., to initiate the delivery cycle, also operates to energize winding 46, to open contacts 44 and simultaneously close contacts 41, restoring the circuits to their original condition in readiness for operation in a completely new cycle when a key 38 is again removed from a switch 21a, 21b, etc.

A totalizing device 66 having an actuating coil 67 is connected between current source 33 and each of the devices 22a, 29a; 22b, 29b, etc., through the contacts 35a of the key switches 21a, 21b, etc., and drum switch 23. Thus, each time any of the devices 29a, 29b, etc. is pulsed to register an incremental parking charge, device 66 will be similarly pulsed to accumulate therein a total of all the charges registered on all the devices 29a, 29b, etc. Device 66 may be used to total charges for a day, week or any other period, and may be reset to zero at the end of the desired period, by means not shown, and known in the art.

Devices 22a, 22b, etc., may be similarly reset to their zero positions at the end of each parking interval registered by the same, through means not shown and known in the art.

As various changes might be made in the embodiment of the invention herein disclosed, without departing from the spirit thereof, it is understood that all matter herein shown or described, shall be deemed illustrative and not by way of limitation except as set forth in the appended claims.

Having thus disclosed our invention, we claim as new and desire to protect by Letters Patent:

1. For use in a parking garage having a plurality of parking stalls and a through driveway, a control system comprising an electrically operated device for indicating elapsed time intervals and the corresponding parking charges for each stall, a switch for controlling each device, a selector switch operable to connect a selected switch and the associated device upon operation of said selected switch, means for operating said selector switch at successive predetermined time intervals, a single electrically operated barrier means in said driveway, single coin operated switch means in circuit with said devices for controlling said barrier means, said selected switch being operable at the end of an elapsed time interval to stop the operation of the associated device thereby indicating the parking charge for said time interval, said coin operated switch means being operable upon deposit therein of coins totalling said parking charge and with a selected switch in its operated position to render said barrier means inoperative.

2. For use in a parking garage having a plurality of parking stalls, a control system comprising an electrically operated time elapse and parking charge calculating and indicating device for each stall, a switch associated with each device and operable at the beginning and end of a parking period to respectively start and stop the associated device, a single electrically operated barrier means for controlling the egress of a vehicle from said garage, a single coin operated switch means, each of said devices including circuit closing means, and circuit means connecting said barrier means, said circuit closing means and said coin operated switch means whereby with a selected switch in its device stopping position deposit of coins totalling the indicated parking charge for said parking period in said coin operated switch means is operative to close said circuit closing means and to operate said barrier means to an inoperative position thereof.

3. A control system for a parking garage having a plurality of parking stalls, an electrically operated time indicating and calculating device associated with each stall, a switch for controlling each device, means for operating said devices at successive time intervals, selector switch means in circuit with said devices and switches for operating a selected device upon the operation of the switch associated with said selected device, said device including normally open circuit closing means and indicating means movable from a zero position in a clockwise direction for registering elapsed time intervals and movable in a counterclockwise direction to said zero position to close said circuit closing means, a single electrically operated barrier means, a single coin operated switch in circuit with each of said devices for controlling the counterclockwise movement of the indicating means thereof, and circuit means connecting said barrier means with said circuit closing means for operating said barrier means in response to operation of said coin operated switch.

4. A control system as in claim 3 wherein each of said first mentioned switches is key operated for two positions thereof, said switch in one position thereof being operative to initiate the operation of the device associated therewith and in the other position thereof being operative to terminate the operation of the device associated therewith.

5. A control system for a garage having a plurality of parking stalls, comprising an electrically operated device for indicating elapsed time intervals and parking charges corresponding thereto for each stall, means for energizing said devices at successive, predetermined time intervals, a two position switch for each device, a selector switch in circuit with said devices and said two position switches and controlling said energizng means upon the operaton of a selected one of said two position switches to one position thereof to operate the device associated therewith, a single electrically operated barrier means, a single coin operated switch means, each of said devices including circuit control means operative in response to the deposit of coins in said coin operated switch means and operation of said selected two position switch to the other position thereof to control the operation of said barrier means.

6. A control system as in claim 5 and further including relay means operative to restore said barrier means to an operative position after the same has been moved to an inoperative position.

7. A control system for a parking garage having a plurality of vehicle parking stalls, comprising a single electrically operated barrier means for controlling the egress of vehices from said garage, electrically operated means associated with each stall for visibly indicating elapsed time intervals and corresponding parking charges for vehicles parked in said stalls, switch means for controlling said time indicating means, coin operated switch means, circuit means connecting the coin operated switch means, switch means and time indicating means, a circuit including said barrier means and controlled by said circuit means, said circuit being rendered operative to actuate said barrier means in response to the deposit of coins in said coin operated switch means corresponding to parking charges indicated on any of said time indicating means.

8. A control system for a parking garage having a plurality of vehicle parking stalls, comprising a single electrically operated barrier means remotely located from said stalls for controlling the egress of vehicles from said garage, electrically operated resettable means associated with each stall for visibly indicating the progressive lapse of time and corresponding parking charges therefor, said time indicating means including control switch means operable upon reset of said time indicating means, a single coin operated switch in circuit with said time indicating means for resetting said time indicating means in response to the deposit of coins therein totalling the indicated parking charges, a circuit including said barrier means operable by said control switch, and switch means in circuit with each of said time indicating means for starting and stopping said time indicating means at the beginning and end of a given time interval respectively.

9. A control system for a parking garage having a plurality of vehicle parking stalls, comprising a single electrically operated barrier means for controlling the egress of vehicles from said garage, a plurality of electrically operated devices for continuously visibly indicating elapsed time intervals and corresponding parking charges respectively associated with said stalls, a plurality of switches respectively controlling said devices, a single coin operated switch, first circuit means connecting said coin operated switch with each of said devices and the controlling switches therefor, second circuit means including said barrier means and controlled by said first circuit means, and means on said devices responsive to the deposit of coins in said coin operated switch corresponding to the indicated parking charges for the stalls respectively associated with said devices for rendering said second circuit means operative.

References Cited in the file of this patent

UNITED STATES PATENTS

| | | |
|---|---|---|
| 2,015,607 | Shinn | Sept. 24, 1935 |
| 2,328,858 | Sweetland | Sept. 7, 1943 |
| 2,358,747 | Teetor | Sept. 19, 1944 |
| 2,637,920 | Stratton | May 12, 1953 |
| 2,691,448 | Lontz | Oct. 12, 1954 |
| 2,712,125 | Koch | June 28, 1955 |

FOREIGN PATENTS

| | | |
|---|---|---|
| 726,207 | Great Britain | Mar. 16, 1955 |